(12) United States Patent
Peng et al.

(10) Patent No.: US 10,503,572 B2
(45) Date of Patent: Dec. 10, 2019

(54) HYBRID REMOTE CONTROLLER

(71) Applicant: SAP SE, Walldorf (DE)

(72) Inventors: Yang Peng, Shanghai (CN); Xia Yu, Shanghai (CN)

(73) Assignee: SAP SE, Walldorf (DE)

(*) Notice: Subject to any disclaimer, the term of this patent is extended or adjusted under 35 U.S.C. 154(b) by 29 days.

(21) Appl. No.: 15/490,193

(22) Filed: Apr. 18, 2017

(65) Prior Publication Data

US 2018/0300189 A1 Oct. 18, 2018

(51) Int. Cl.
G06F 3/00 (2006.01)
G06F 9/54 (2006.01)
G06F 9/448 (2018.01)
G06F 8/60 (2018.01)

(52) U.S. Cl.
CPC .............. G06F 9/547 (2013.01); G06F 8/60 (2013.01); G06F 9/4488 (2018.02); G06F 9/546 (2013.01)

(58) Field of Classification Search
CPC ...... G06F 9/547; G06F 9/4488; G06F 9/4428; G06F 9/546
See application file for complete search history.

(56) References Cited

U.S. PATENT DOCUMENTS

| 9,535,823 | B2* | 1/2017 | Peretz | G06F 11/3684 |
| 10,185,590 | B2* | 1/2019 | Argenti | G06F 9/5027 |
| 2005/0240554 | A1* | 10/2005 | Evans | G06F 16/30 |
| 2010/0042974 | A1* | 2/2010 | Gutz | G06F 8/71 |
| | | | | 717/121 |
| 2013/0235992 | A1* | 9/2013 | Dawson | G06F 9/5027 |
| | | | | 379/201.02 |
| 2015/0249675 | A1* | 9/2015 | Yeung | G06F 9/44521 |
| | | | | 726/22 |
| 2017/0177317 | A1* | 6/2017 | Mark | G06F 8/61 |

* cited by examiner

Primary Examiner — Andy Ho
Assistant Examiner — Abdou K Seye
(74) Attorney, Agent, or Firm — Mintz Levin Cohn Ferris Glovsky and Popeo, P.C.

(57) ABSTRACT

In one aspect there is provided a method. The method may include: executing, at a client, an application that includes a first function and a second function; determining, based at least on an indicator, that the first function is to be executed locally at the client and the second function is to be executed remotely at a server; generating a package that includes a first class definition of a first class, the first class definition being required for executing the second function based at least on the second function including a reference to the first class; and sending, to the server, the package to at least enable the server to execute the second function. Systems and articles of manufacture, including computer program products, are also provided.

21 Claims, 5 Drawing Sheets

HYBRID REMOTE CONTROLLER

TECHNICAL FIELD

The subject matter described herein relates generally to distributed computing and more specifically to hybridized remote computing.

BACKGROUND

In a distributed computing environment, one device may be able to access data and/or invoke methods on another remote device. For instance, in a client-server model, tasks may be divided between the servers that provide resources and/or services and the clients that consume the resources and/or the services. Alternately, in a peer-to-peer model, services and/or resources may be shared amongst a group of peer nodes having identical privileges and/or capabilities.

SUMMARY

Systems, methods, and articles of manufacture, including computer program products, are provided for sub-execution environment control. In some example embodiments, there is provided a computer-implemented method. The method may include: executing, at a client, an application that includes a first function and a second function; determining, based at least on an indicator, that the first function is to be executed locally at the client and the second function is to be executed remotely at a server; generating a package that includes a first class definition of a first class, the first class definition being required for executing the second function based at least on the second function having a reference to the first class; and sending, to the server, the package to at least enable the server to execute the second function.

In some variations, one or more features disclosed herein including the following features can optionally be included in any feasible combination. The second function may be defined by a second class definition as being associated with a second class. The first class definition may be determined to include another reference to a third class, the third class being associated with a third class definition. The package may be generated to include the third class definition, the third class definition being required for executing the second function based at least on the first class definition including the other reference to the third class. The first function may be executed at the client. Program code associated with the second function may be tagged with the indicator, the indicator providing an indication that the second function is to be executed remotely at the server. The package may be further generated to include an input parameter of the second function and/or program code for the second function.

In some variations, whether the first class definition is available at the server may be determined, the first class definition being included in the package based at least on a determination that the first class definition is unavailable at the server. The determining of whether the first class definition is available at the server may be based on a whitelist of one or more class definitions that are available at the server. The determining of whether the first class definition is available at the server may be based on a blacklist of one or more class definitions not available at the server.

In some variations, the second function may be executed in a sandbox at the server, the second function being executed in the sandbox to at least isolate the execution of the second function from a third function that is being simultaneously executed at the server.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Data and functionalities that are available on a server may be exposed via application programming interfaces including, for example, Java® Remote Method Invocation and Windows® Communication Foundation. Thus, a client may access data and/or invoke methods remotely on the server via one or more application programming interface calls. However, remoting in this manner may limit the client to only those functionalities that are already defined at the server. Moreover, the client must be configured in accordance with the application programming interface of the server. As such, in some example embodiments, hybrid remoting may enable the client to dynamically define one or more remote functionalities that are to be offloaded for execution at the server.

In some example embodiments, a client may invoke any remote function at a server by least providing, to the server, the information required for executing the remote function at the server. As such, the client is not limited to only those functions that are already defined at the server. Instead, the client may be able to offload any function for execution at the server.

For clarity and conciseness, various embodiments of the present disclosure are described with respect to a client and a server. However, it should be appreciated that a client may refer to any device that invokes a remote function while a server may refer to any device that executes a remote function. As such, the present disclosure may apply to any computing architecture including, for example, client-server, n-tier, peer-to-peer, and/or the like.

Figure 1:
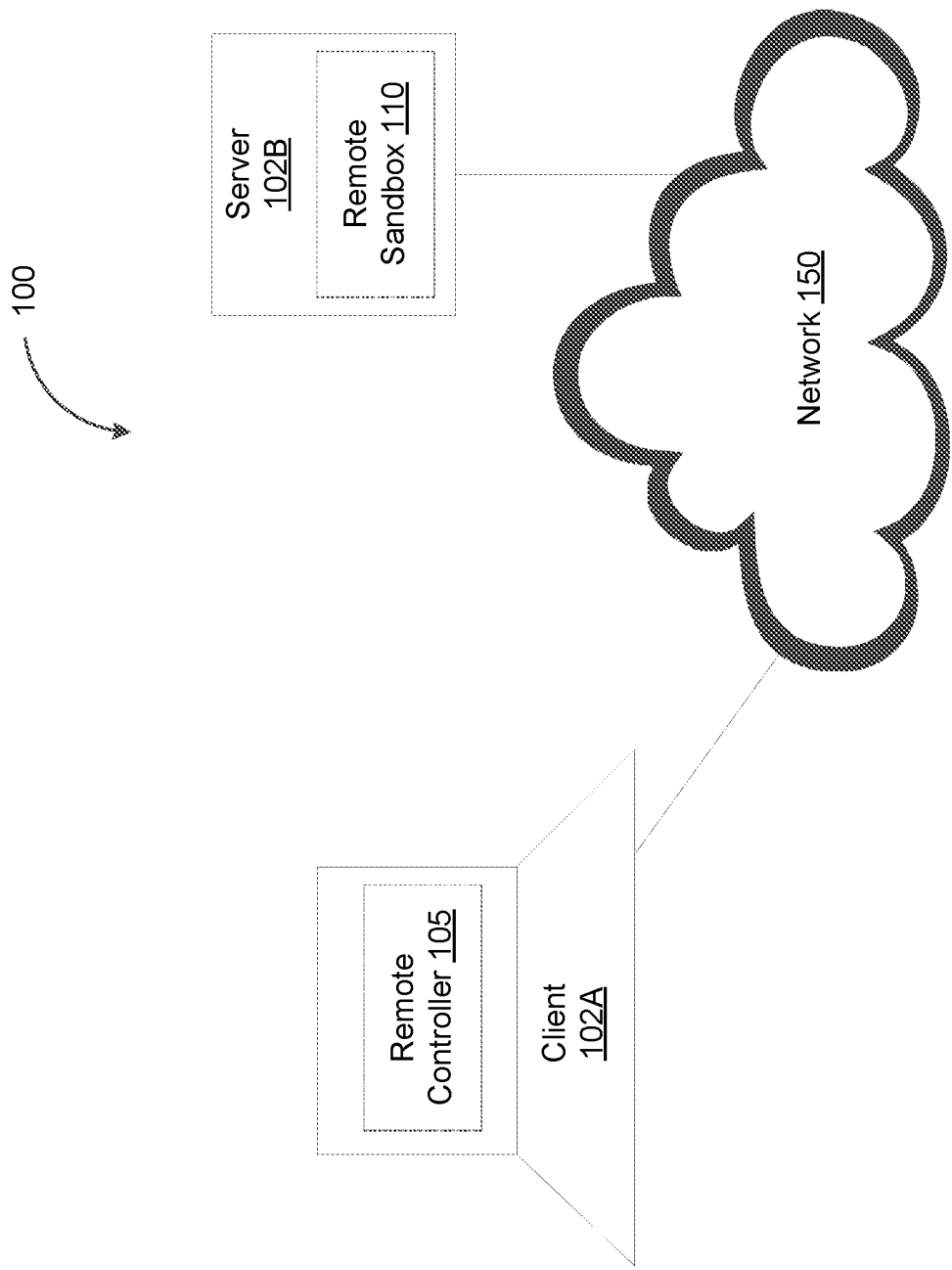
FIG. 1 depicts a system diagram illustrating a hybrid remote system, in accordance with some example embodiments.

FIG. 1 depicts a system diagram illustrating a hybrid remote system 100, in accordance with some example embodiments. Referring to FIG. 1, a client 102A may be communicatively coupled with a server 102B via at least one wired and/or wireless network 150. The network 150 may be the Internet, a public land mobile network, a local area network (WLAN), a wide area network (WAN), a point-to-point link, and/or the like. The client 102A and/or the server 102B may be, for example, a computer, a tablet, a mobile device, a smart phone, and/or any other device including at least one processor and at least one memory including program code. It should be appreciated that the client 102A and the server 102B be part of any computing architecture including, for example, client-server, n-tier, peer-to-peer, and/or the like.

As shown in FIG. 1, the client 102A may include a remote controller 105. The remote controller 105 may be configured to identify and configure remote functions to at least enable an interception of the remote functions when the remote functions are run at the client 102A. For instance, the client 102A may offload a remote function for execution at the server 102B. A function may be designated as a remote function by at least tagging program code associated with the function with an indicator that the function is to be executed remotely at the server 102B. For example, the program code associated with the function may be tagged with a flag such as "REMOTABLE," although other indicators may be used as well. The presence of the indicator may indicate that the portion of the program code is to be offloaded from the client 102A to the server 102B for remote execution. The designation of the function as a remote function may be performed any time such as, for example, during development. Moreover, the function may be designated as the remote function for a variety of reasons including, for example, load balancing and/or resource availability across the client 102A and the server 102B.

In some example embodiments, the client 102A may run an application that includes both local functions and remote functions. The local functions may be executed at the client 102A while the remote functions may be executed at the server 102B. The client 102A may include a remote controller 105 configured to identify the remote functions that are to be executed at the server 102B. The remote controller 105 may identify the remote functions based on the presence of indicators such as a "REMOTABLE" flag. The remote controller 105 may further configure the remote functions to at least enable an interception of the remote functions at runtime. When the remote controller 105A intercepts a remote function at the client 102A, the remote controller 105 may provide, to the server 102B, information required to execute the remote function at the server 102B.

The remote function may be a method that is defined by a class definition and may thus belong to a corresponding class. As used herein, a class definition may set forth variables that define the state of one or more objects instantiated based on the class definition. The class definition may further set forth methods that define the behavior these objects. According to some example embodiments, the remote controller 105A may intercept the remote function in order to identify the one or more classes that are required for executing the remote function at the server 102B. A remote function belonging to one class may directly and/or indirectly invoke one or more other classes. For example, the program code for the remote function may include references to another class. Thus, executing the remote function may require one or more other classes.

The remote controller 105 may provide, to the server 102B, information required for executing the remote function at the server 102B. For instance, the remote controller 105 may generate a dependency package and a context package for the remote function. The dependency package and the context package may include information required for executing the remote function at the server 102B.

The dependency package may include class definitions for the classes that are required for executing the remote function at the server 102B. For instance, the dependency package may include the class definitions that are required for executing the remote function but are unavailable at the server 102B. The remote controller 105 may determine whether a class is available at the server 102B based on a whitelist of all of the classes that are available at the server 102B. Alternately and/or additionally, the remote controller 105 may determine whether a class is available at the server 102B based on a blacklist of all of the classes that are not available at the server 102B. The remote controller 105 may further provide the dependency package to the server 102B in order to enable the remote function to be executed at the server 102B.

The context package may include one or more input parameters for the remote function. While the remote function may be executed at the server 102B, these input parameters for the remote function may be received at the client 102A. As such, the context package may include the input parameters in order to forward these input parameters from the client 102A to the server 102B. For a remote function that is a non-static method, the context package may further include the state variables for an object (e.g., an instance of a class) to which the remote function belongs. According to some example embodiments, the context package may be provided along with a dependency package to enable the remote function to be executed at the server 102B. The remote controller 105 may further serialize the context package by at least converting the contents of the context package into a format, such as a byte sequence, that facilitates transmission of the context package to the server 102B and subsequent reconstruction of the context package by the server 102B. For example, serializing an object may include converting the state of the object into a byte sequence that can be later reverted back into a copy of the object.

The server 102B may execute the remote function based at least on a corresponding dependency package and context package provided by the client 102A. For instance, the server 102B may reconstruct (e.g., de-serialize) the serialized object from the context package and execute the remote function with the input parameters included in the context package. Here, executing the remote function at the server 102B may further include loading, at the server 102B, the class definitions that are included in the dependency package. According to some example embodiments, the server 102B may provide a remote sandbox 110 for executing the remote function. The remote function may be executed within the remote sandbox 110 in order to the execution of that remote function from the execution of other remote functions. The use of the remote sandbox 110 enables the server 102B may be able to parallel execute multiple remote functions. It should be appreciated that a result of executing the remote function may include one or more updates to the state variable of the object to which the remote function belongs. The server 102B can send these updated state variables back to the client 102A.

Figure 2:
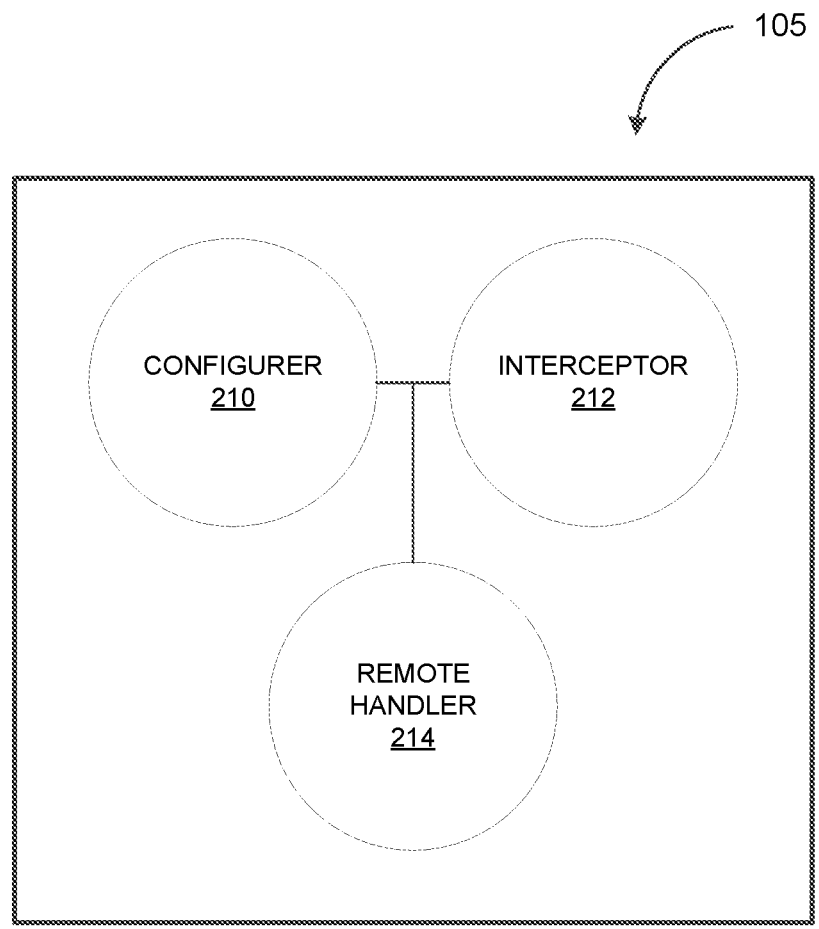
FIG. 2 depicts a block diagram illustrating a remote controller, in accordance with some example embodiments.

FIG. 2 depicts a block diagram illustrating the remote controller 105, in accordance with some example embodiments. Referring to FIGS. 1-2, the remote controller 105 may implement one or more of the remote controller 105 and the second remote controller 105B described with respect to FIG. 1. As shown in FIG. 2, the remote controller 105 may include a configurer 210, an interceptor 212, and a remote handler 214. It should be appreciated that the remote controller 105 may include different and/or additional components than shown.

The configurer 210 may be configured to identify remote functions that are to be executed at the server 102B. The client 102A may load an application that includes both local functions for execution at the client 102A and remote functions for execution at the server 102B. According to some example embodiments, program code for a remote function may be tagged with an indicator that enables the configurer 210 to identifying this program code as corresponding to a remote function. To further illustrate, Table 1 below provides an example of program code for a remote function. The program code shown in Table 1 has been annotated with the flag "REMOTABLE," which may indicate to the configurer 210 that this program code corresponds to a remote function that is to be executed at the server 102B.

TABLE 1

```
@Remotable                                              (type=Remotype.REMOTE,
provider="qray:sw://10.129.126.209:8080/capillary")
private static int calculateRemoteUsers (int maxNum)    {
    FastLocalDB dd = new FastLocalDB( );
    return dd.getUserCount( );
}
```

The configurer 210 may configure a function that has been identified, based on the presence of an indicator, as a remote function. The configurer 210 may configure the remote function by at least inserting, into the program code for the remote function, program code configured to intercept the remote function when the configured program code is run at the client 102A. According to some example embodiments, intercepting the remote function may enable the remote function to be subsequently offloaded from the client 102A to the server 102B for remote execution. To further illustrate, Table 2 below provides an example of program code for a remote function. The program code shown in Table 2 has been configured to include program code that enables an interception of the remote function when this configured code is run at the client 102A. As shown in Table 2, the program code for a remote function may be configured with program code that calls the interceptor 212 with information required for executing the remote function including, for example, a name of the remote function, the input parameters for the remote function, and/or an object to which the remote function belongs.

TABLE 2

```
@Remotable                                              (type=Remotype.REMOTE,
provider="qray:sw://10.129.126.209:8080/capillary")
private static int calculateRemoteUsers (int maxNum)    {
    HybridInterceptor.intercept (new Object [ ]{maxNum},
        "com/a/TestClass.calculateRemoteUsers(I)I",
        null);
    return HybridInterceptor.getRetVal( );
    FastLocalDB dd = new FastLocalDB( );
    return dd.getUserCount( );
}
```

The interceptor 212 may be configured to perform class dependency analysis by at least determining one or more classes that are required for executing a remote function because the remote function directly or indirectly invokes these one or more classes. For instance, the interceptor 212 may determine the one or more classes that are required for executing the remote function based at least on a loading order for the remote function at runtime. The loading order for the remote function may be determined by at least identifying, recursively, classes that are referenced directly and/or indirectly by the remote function. It should be appreciated that the loading order for the remote function may indicate the classes that are required for executing the remote function by at least indicating the classes that are loaded in order to execute the remote function.

For example, the remote function may be associated with a first class because the remote function is a static method that belongs to that first class. Alternately and/or additionally, the remote function may be associated with the first class because the remote function is a non-static method that belongs to an object that is an instance of the first class. The compiled program code for the remote function may include a reference to at least a second class because the remote function directly invokes the second class by, for example, referring to an object that is an instance of the second class. Meanwhile, this second class may further reference a third class. Here, the class definition for the second class may, for example, include one or more references to the third class. Thus, executing the remote function would require loading the third class followed by the second class then the first class. Alternately and/or additionally, a circular reference may also arise, for example, when a first class references a second class that includes references back to the first class. In this instance, executing the remote function may require loading the first class and the second class simultaneously.

To further illustrate, Table 3 below provides an example of program code for a remote function that has both direct and indirect references to one or more other classes. As shown in Table 3, the interceptor 212 may identify, based on the program code for the saveImage( ) remote function, that the saveImage( ) remote function directly references an Image class and a Storage class. The interceptor 212 may further determine, based on the class definitions for the Image class and the Storage class, whether the Image class and/or the Storage class include references to other classes and/or to each other.

TABLE 3

@Remotable(type=remotable)
private void saveImage (Image img, Boolean generate thumbnail) {
  If (...) img.genThumbnail( ).sav(getStorage( ));
}

The remote handler 214 may be configured to generate a dependency package and context package that include information required for executing a remote function at the server 102B. The dependency package may include the class definitions of the classes that are required for executing the remote function but are unavailable at the server 102B. According to some example embodiments, the remote handler 214 may determine whether a class is available at the server 102B based on a whitelist of all of the classes that are available at the server 102B. As such, the remote handler 214 may include, in the dependency package, the classes that are required for executing the remote function but are not on the whitelist. Alternately and/or additionally, the remote handler 214 may determine whether a class is available at the server 102B based on a blacklist of all of the classes that are not available at the server 102B. Here, the remote handler 214 may include, in the dependency package, the classes in the blacklist that are also required for executing the remote function.

In some implementations of the current subject matter, the whitelist can be generated to exclude third-party class libraries. Meanwhile, a corresponding blacklist can be generated from the whitelist to include third-party class libraries. As such, functions defined by these third-party class libraries can be prevented from being offloaded from the client 102A to the server 102B for remote execution. Alternately and/or additionally, the whitelist and/or the blacklist can be generated based on the roles and/or functionalities assigned to the client 102A and/or the server 102B. For example, the client 102A can be designated as an image processor while the server 102B can be designated as an email server. The whitelist and/or the blacklist can correspond to these designations of the client 102A as an image processor and the server 12B as an email server. Thus, the whitelist can include class libraries associated with an email server, thereby enabling email server functionalities to be offloaded from the client 102A to the server 102B for remote execution. By contrast, the blacklist can include class libraries associated with an image processor, thereby ensuring that image processing functionalities are performed at the client 102 and not offloaded to the server 102B for remote execution.

A context package may include one or more input parameters for the remote function. While the remote function may be executed at the server 102B, these input parameters for the remote function may be received at the client 102A. As such, the remote handler 214 may include these input parameters in the context package in order to forward these input parameters from the client 102A to the server 102B. For a remote function that is a non-static method, the remote handler 214 may further include, in the context package, the object (e.g., an instance of the class) to which the remote function belongs. As noted earlier, the object may be instantiated based on a class definition that specifies the remote function as a method that may be performed by the object.

The remote handler 214 may be configured to provide the dependency package and the context package to the server 102B in order to enable an execution of the remote function at the server 102B. According to some example embodiments, the remote handler 214 may further serialize the context package by at least converting the contents of the context package into a format such as a byte sequence that enables the context package to be transmitted to the server 102B and subsequently reconstructed at the server 102B. For example, the remote handler 214 may serialize an object by at least converting the state of the object into a byte sequence that can be later reverted, at the server 102B, back into a copy of the object. It should be appreciated that the remote function may be executed at the server 102B based at least on the dependency package and the context package. For instance, the server 102B may provide the remote sandbox 110 for executing the remote function. The remote sandbox 110 may be configured to isolate the execution of the remote function from, for example, the execution of other remote functions at the server 102B.

Figure 3:
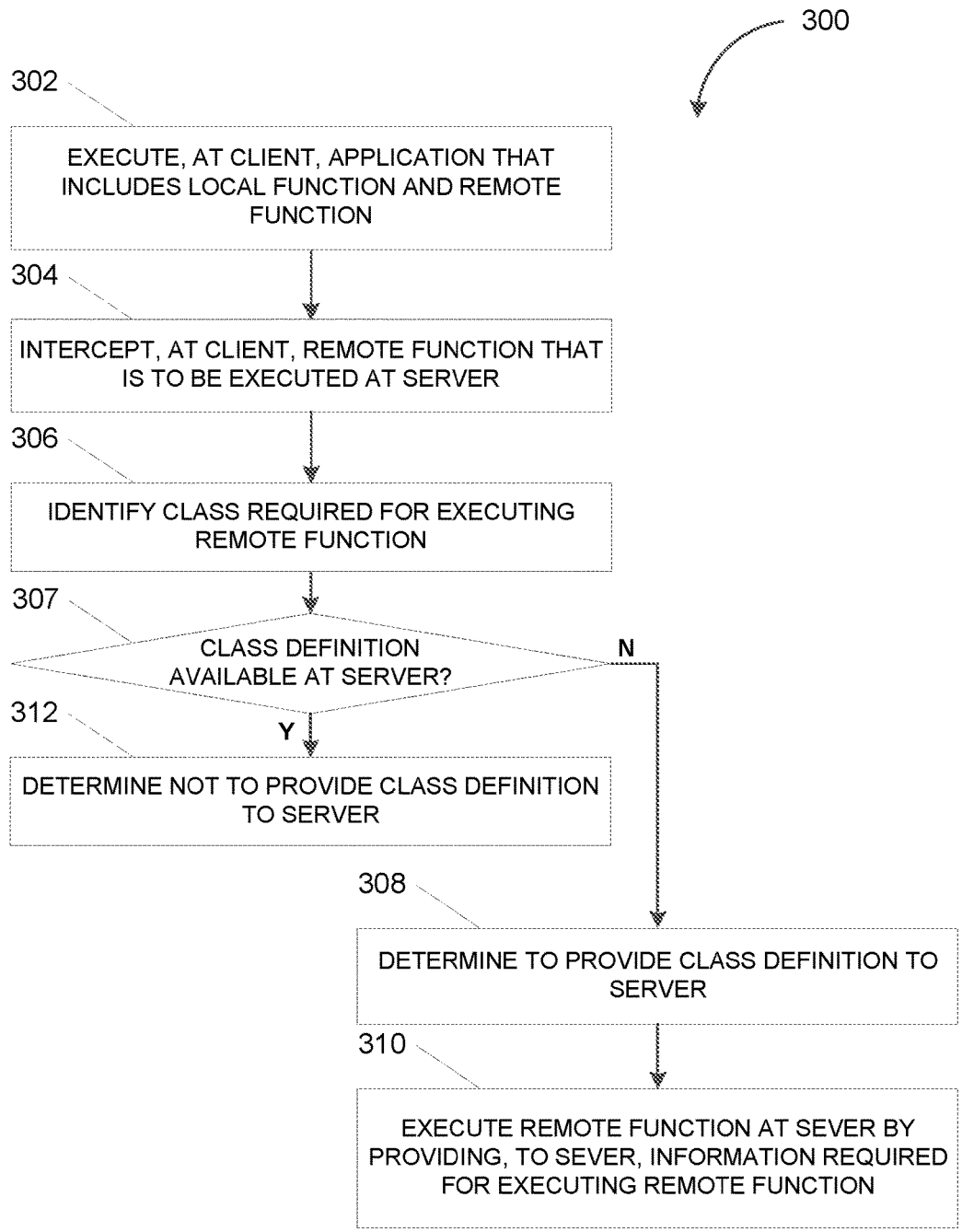
FIG. 3 depicts a flowchart illustrating a process for hybrid remoting, in accordance with some example embodiments.

FIG. 3 depicts a flowchart illustrating a process 300 for hybrid remoting, in accordance with some example embodiments. Referring to FIGS. 1-3, the process 300 may be performed by the remote controller 105 at the client 102A.

At 302, the remote controller 105 may execute, at the client 102A, an application that includes both local functions and remote functions. The local functions may be executed at the client 102A while the remote functions may be offloaded from the client 102A to the server 102B for remote execution.

At 304, the remote controller 105 may intercept the remote function that is to be executed at the server 102B. For example, the client 102A may run an application that includes both local functions and remote functions. The local functions may be executed locally at the client 102A while the remote functions may be executed at the server 102B. Thus, the remote controller 105 may intercept the remote function when the remote function, which may be configured to enable a runtime interception of the remote function, is run at the client 102A.

At 306, the remote controller 105 may identify at least one class that is required for executing the remote function. For example, the remote function may be associated with one class because the remote function is a static method belonging to that class and/or because the remote function is a non-static method belonging to an object that is an instance of the class. The remote function may further depend on one or more other class because the remote function directly and/or indirectly invokes these other classes. For instance, the remote function may make direct references to an object belonging to another class. Alternately and/or additionally, the remote function may directly reference one class that in turn references another class. Thus, the remote controller 105 may determine, based at least on a loading order for the remote function, the classes that are directly and/or indirectly invoked by the remote function.

At 307, the remote controller 105 may determine whether the at least one class that is required for executing the remote function is available at the server 102B. For example, the remote controller 105 may determine whether a class that is required for executing a remote function is available at the server 102B based on a whitelist of all of the classes that are available at the server 102B. Alternately and/or additionally, the remote controller 105 may determine whether the class is available at the server 102B based on a blacklist of all of the classes that are not available at the server 102B.

At 307-Y, the remote controller 105 may determine that the at least one class is available at the server 102B. As such, at 312, the remote controller 105 may determine to not provide the at least one class to the server 102B. Alternately and/or additionally, at 307-N, the remote controller 105 may determine that at least one class is not available at the server 102B. Here, at 308, the remote controller 105 may determine to provide the at least one class to the server 102B. For instance, when the remote controller 105 determines that a class that is required for executing the remote function is not available at the server 102B, the remote controller 105 may generate a dependency package that includes the class definition for the unavailable class in order to be able to subsequently provide that class to the server 102B.

At 310, the remote controller 105 may execute the remote function at the server 102B by at least providing, to the server 102B, information required for executing the remote function at the server 102B. For example, in some example embodiments, the remote controller 105 may provide, to the server 102B, the dependency package, which may include the class definitions of the classes that are required for executing the remote function but are not available at the server 102B. Furthermore, the remote controller 105 may also provide a context package that includes at least one input parameter for the remote function and/or an object to which the remote function belongs.

The remote controller 105 may enable an execution of the remote function at the server 102B by at least providing, to the server 102B, the dependency package and/or the context package. According to some example embodiments, the server 102B may execute the remote function based at least on the contents of the context package. The server 102B may further execute the remote function by at least loading, from the dependency package, the class definitions that are required for executing the remote function. It should be appreciated that the remote function may be executed in the remote sandbox 110 at the server 102B in order to isolate the execution of the remote function from the execution of other remote functions at the server 102B.

Figure 4:
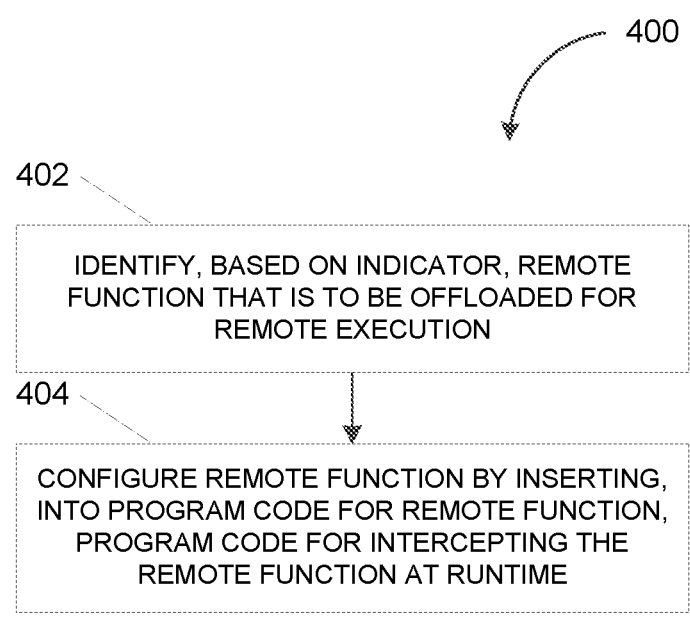
FIG. 4 depicts a flowchart illustrating a process for configuring a remote function, in accordance with some example embodiments.

FIG. 4 depicts a flowchart illustrating a process 400 for configuring a remote function, in accordance with some example embodiments. Referring to FIGS. 1-4, the process 400 may be performed by the remote controller 105 at the client 102A.

At 402, the remote controller 105 may identify, based at least on the presence of an indicator, a remote function that is to be offloaded from the client 102A to the server 102B for remote execution. For example, a function may be designated as a remote function by at least tagging program code associated with the function with a flag such as, for example, a "REMOTABLE" flag. This tagging may be performed, for example, during the development of an application that includes both local functions that are to be performed locally and remote functions that are to be offloaded for remote execution. The flag may indicate that this program code corresponds to a remote function and is to be executed remotely at the server 102B. Thus, the remote controller 105 identify whether a portion of program code corresponds to a remote function based at least on the presence of a flag associated with the program code.

At 404, the remote controller 105 may configure the remote function by at least inserting, into program code for the remote function, program code configured to intercept the remote function when the remote function is executed. For example, the remote controller 105 may, in response to identifying the remote function, configure the remote function in order to enable an interception at runtime. In some example embodiments, the remote controller 105 may configure the program code for the remote function with program code that invokes the remote controller 105 to intercept the remote function when the remote function is run at the client 102A. In order to intercept the remote function, the program code may call the remote controller 105 with information required for executing the remote function including, for example, a name of the remote function, the input parameters for the remote function, and/or an object to which the remote function belongs. Intercepting the remote function at runtime may enable the remote controller 105 to offload the execution of the remote function from the client 102A to the server 102B.

Figure 5:
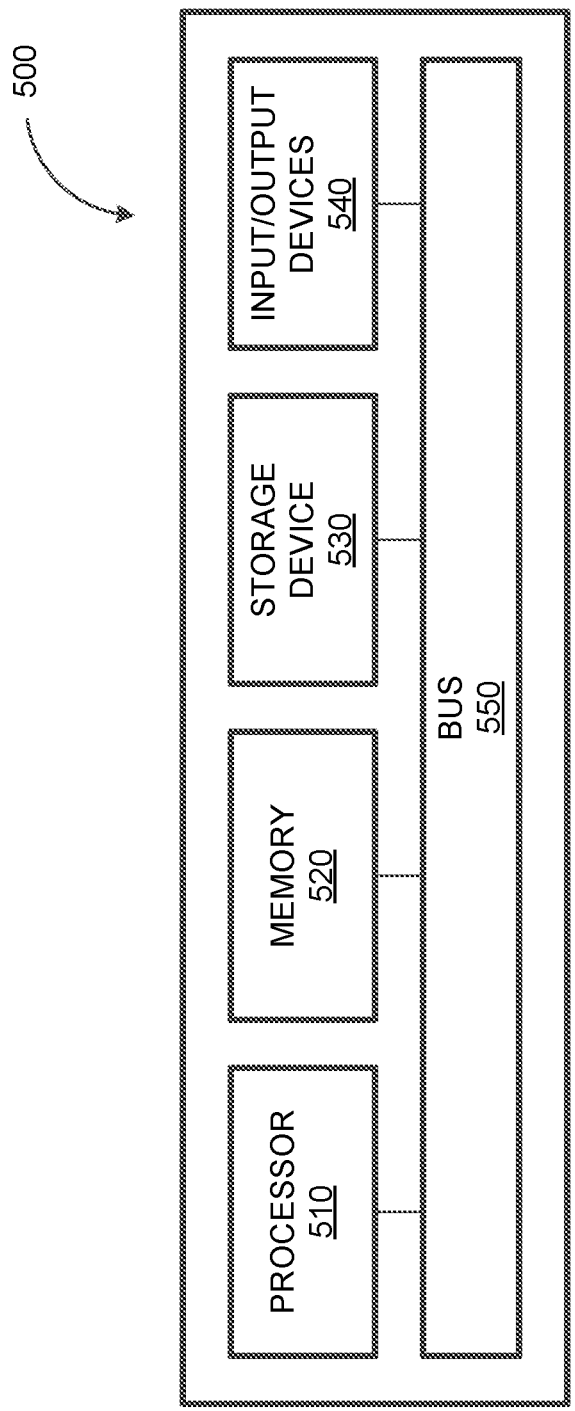
FIG. 5 depicts a block diagram illustrating a computing system, in accordance with some example embodiments.

FIG. 5 depicts a block diagram illustrating a computing system 500, in accordance with some example embodiments. Referring to FIGS. 1 and 5, the computing system 500 can be used to implement the client 102A, the server 102B, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the client 102A and/or the server 102B. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile random-access memory (RAM) that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In some of the example described above, an administrator is described. The administrator may represent a fully and/or or partially automated computer-based process.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few implementations have been described in detail above, other modifications or additions are possible. In particular, further features and/or implementations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claim.

What is claimed is:

1. A computer-implemented method, comprising:
   determining, based at least on an indicator, that a first function comprising an application is to be executed locally at a client and a second function comprising the application is to be executed remotely at a server;
   in response to determining that the first function is to be executed locally at the client and the second function is to be executed remotely at the server, modifying a program code associated with the second function to at least enable an interception of the second function when the second function is executed at the client; and
   executing, at the client, the application including the first function and the second function, the application being executed by at least
      executing, at the client, the first function,
      responding to a call from the second function by at least intercepting an execution of the second function, the execution of the second function being intercepted in order to perform a dependency analysis of one or more classes required for executing the second function,
      generating, based at least on the dependency analysis, a package that includes a first class definition of a first class, the first class definition being required for executing the second function based at least on the second function having a reference to the first class, and
      executing the second function by at least sending, to the server, the package to at least enable the server to execute the second function.

2. The computer-implemented method of claim 1, wherein the second function is defined by a second class definition as being associated with a second class.

3. The computer-implemented method of claim 1, further comprising:
   determining that the first class definition includes another reference to a third class, the third class being associated with a third class definition; and
   generating the package to include the third class definition, the third class definition being required for executing the second function based at least on the first class definition including the other reference to the third class.

4. The computer-implemented method of claim 1, further comprising executing the first function at the client.

5. The computer-implemented method of claim 1, further comprising tagging program code associated with the second function with the indicator, the indicator providing an indication that the second function is to be executed remotely at the server.

6. The computer-implemented method of claim 1, wherein the package is further generated to include an input parameter of the second function and/or program code for the second function.

7. The computer-implemented method of claim 1, further comprising determining whether the first class definition is available at the server, the first class definition being included in the package based at least on a determination that the first class definition is unavailable at the server.

8. The computer-implemented method of claim 7, wherein the determining of whether the first class definition is available at the server is based on a whitelist of one or more class definitions that are available at the server.

9. The computer-implemented method of claim 7, wherein the determining of whether the first class definition is available at the server is based on a blacklist of one or more class definitions not available at the server.

10. The computer-implemented method of claim 1, wherein the second function is executed in a sandbox at the server, and wherein the second function is executed in the sandbox to at least isolate the execution of the second function from a third function that is being simultaneously executed at the server.

11. The computer-implemented method of claim 1, wherein the program code associated with the second function is modified to include additional program code to call for an interception of the second function during the execution of the second function, and wherein the call includes a name of the second function, one or more input parameters of the second function, and/or an object to which the second function belongs.

12. A system, comprising:
   at least one processor; and
   at least one memory storing instructions which, when executed by the at least one processor, result in operations comprising:
      determining, based at least on an indicator, that a first function comprising an application is to be executed locally at a client and a second function comprising the application is to be executed remotely at a server;
      in response to determining that the first function is to be executed locally at the client and the second function is to be executed remotely at the server, modifying a program code associated with the second function to at least enable an interception of the second function when the second function is executed at the client; and executing, at the client, the application including the first function and the second function, the application being executed by at least executing, at the client, the first function, responding to a call from the second function by at least intercepting an execution of the second function, the execution of the second function being intercepted in order to perform a dependency analysis of one or more classes required for executing the second function, generating, based at least on the dependency analysis, a package that includes a first class definition of a first class, the first class definition being required for executing the second function based at least on the second function having a reference to the first class, and executing the second function by at least sending, to the server, the package to at least enable the server to execute the second function.

13. The system of claim 12, wherein the second function is defined by a second class definition as being associated with a second class.

14. The system of claim 12, further comprising:

determining that the first class definition includes another reference to a third class, the third class being associated with a third class definition; and generating the package to include the third class definition, the third class definition being required for executing the second function based at least on the first class definition including the other reference to the third class.

15. The system of claim 12, further comprising executing the first function at the client.

16. The system of claim 12, further comprising tagging program code associated with the second function with the indicator, the indicator providing an indication that the second function is to be executed remotely at the server.

17. The system of claim 12, wherein the package is further generated to include an input parameter of the second function and/or program code for the second function.

18. The system of claim 12, further comprising determining whether the first class definition is available at the server, the first class definition being included in the package based at least on a determination that the first class definition is unavailable at the server.

19. The system of claim 18, wherein the determining of whether the first class definition is available at the server is based on a whitelist of one or more class definitions that are available at the server and/or a blacklist of one or more class definitions not available at the server.

20. The system of claim 12, wherein the second function is executed in a sandbox at the server, and wherein the second function is executed in the sandbox to at least isolate the execution of the second function from a third function that is being simultaneously executed at the server.

21. A non-transitory computer-readable storage medium including program code, which when executed by at least one data processor, cause operations comprising:

determining, based at least on an indicator, that a first function comprising an application is to be executed locally at a client and a second function comprising the application is to be executed remotely at a server;

in response to determining that the first function is to be executed locally at the client and the second function is to be executed remotely at the server, modifying a program code associated with the second function to at least enable an interception of the second function when the second function is executed at the client; and executing, at the client, the application including the first function and the second function, the application being executed by at least executing, at the client, the first function, responding to a call from the second function by at least intercepting an execution of the second function, the execution of the second function being intercepted in order to perform a dependency analysis of one or more classes required for executing the second function, generating, based at least on the dependency analysis, a package that includes a first class definition of a first class, the first class definition being required for executing the second function based at least on the second function having a reference to the first class, and executing the second function by at least sending, to the server, the package to at least enable the server to execute the second function.

* * * * *